(12) United States Patent
Pham et al.

(10) Patent No.: US 11,080,193 B2
(45) Date of Patent: Aug. 3, 2021

(54) METHOD FOR IMPROVING THE EXECUTION TIME OF A COMPUTER APPLICATION

(71) Applicant: BULL SAS, Les Clayes sous Bois (FR)

(72) Inventors: Trong Ton Pham, Grenoble (FR); Lionel Vincent, Fontaine (FR); Grégoire Pichon, Seyssins (FR)

(73) Assignee: BULL SAS, Les Clayes sous Bois (FR)

( * ) Notice: Subject to any disclaimer, the term of this patent is extended or adjusted under 35 U.S.C. 154(b) by 82 days.

(21) Appl. No.: 16/230,120

(22) Filed: Dec. 21, 2018

(65) Prior Publication Data

US 2019/0196971 A1 Jun. 27, 2019

(30) Foreign Application Priority Data

Dec. 22, 2017 (FR) ..................................... 17 63189

(51) Int. Cl.
| | | |
|---|---|---|
| *G06F 12/08* | (2016.01) | |
| *G06F 12/0862* | (2016.01) | |
| *G06F 16/172* | (2019.01) | |
| *G06N 20/00* | (2019.01) | |
| *G06F 16/182* | (2019.01) | |

(52) U.S. Cl.
CPC ........ *G06F 12/0862* (2013.01); *G06F 16/172* (2019.01); *G06F 16/182* (2019.01); *G06N 20/00* (2019.01); *G06F 2212/1021* (2013.01); *G06F 2212/502* (2013.01); *G06F 2212/602* (2013.01); *G06F 2212/6026* (2013.01)

(58) Field of Classification Search
CPC ... G06F 12/0862; G06F 16/182; G06F 16/172
See application file for complete search history.

(56) References Cited

U.S. PATENT DOCUMENTS

| | | | |
|---|---|---|---|
| 6,789,171 B2 | 9/2004 | Desai et al. | |
| 7,676,630 B2 | 3/2010 | Qiao | |
| 2008/0086600 A1* | 4/2008 | Qiao | .................. G06F 12/0862 711/133 |
| 2014/0006718 A1* | 1/2014 | Ramani-Augustin | ....................... G06F 9/3455 711/137 |
| 2016/0241669 A1* | 8/2016 | Royon | .................. H04L 67/327 |

(Continued)

FOREIGN PATENT DOCUMENTS

EP 2947557 11/2015

OTHER PUBLICATIONS

Xu Ji, Understanding object-level memory access patterns across the spectrum, Nov. 2017, ACM (Year: 2017).*

(Continued)

*Primary Examiner* — Ryan Bertram
(74) *Attorney, Agent, or Firm* — Meagher Emanuel Laks Goldberg & Liao, LLP (57) ABSTRACT

A method for improving the execution time of a computer application comprises at least one cycle includes: a step of determining the type of memory access time sequence occurring during execution of the computer application; a step of preloading data, from a file system to a cache memory system, according to the determined type of memory access time sequence. The determination step is carried out by a learning model having been previously configured using a database of certain predetermined types of memory access time sequences.

15 Claims, 6 Drawing Sheets

(56) References Cited

U.S. PATENT DOCUMENTS

| | | | |
|---|---|---|---|
| 2017/0031823 A1 | 2/2017 | Ross et al. | |
| 2018/0211033 A1* | 7/2018 | Aditham | G06F 21/52 |
| 2018/0276113 A1* | 9/2018 | Navon | G06N 5/022 |
| 2019/0114275 A1* | 4/2019 | Dropps | G06F 12/0862 |
| 2019/0129834 A1* | 5/2019 | Purkayastha | H01L 27/11556 |

OTHER PUBLICATIONS

StackExchange, Why do we need to normalize data before principal component analysis (PCA)? [duplicate], Sep. 4, 2013, available at https://stats.stackexchange.com/questions/69157/why-do-we-need-to-normalize-data-before-principal-component-analysis-pca (Year: 2013).*
Guttman et al, Machine Leming Techniques for Improved Data Prefetching, Dec. 10, 2015, IEEE Xplore (Year: 2015).*
Input/Output Access Pattern Classification Using Markov Models (Tara M. Madhyastha and Daniel A. Reed, from the Proceedings of the Fifth Workshop on Input/Output in Parallel and Distributed Systems pp. 57-67.
I/O Acceleration with Pattern Detection (Jun He, John Bent, Aaron Torres, Gary Grader, Garth Gibson, Carlos Maltzahn, Xian-He Sun, from the Proceedings of the 22nd International Symposium on High-Performance Parallel and Distributed Computing pp. 25-36.
Guttman Diana et al—Machine learning techniques for improved data prefectching—Mar. 24, 2015.
Shih-Wei Liao et al—Machine learning-based prefetch optimization for data center applications—Nov. 14, 2009.
@bmj0114 "K-Means clustering via PCA" Qiita—Aug. 9, 2017.

\* cited by examiner

METHOD FOR IMPROVING THE EXECUTION TIME OF A COMPUTER APPLICATION

FIELD OF THE INVENTION

The invention relates to a method for improving the execution time of a computer application, by determining a type of memory access time sequence generated by the computer application.

BACKGROUND OF THE INVENTION

According to a first prior art, for example presented in the document *Input/Output Access Pattern Classification Using Markov Models* (Tara M. Madhyastha and Daniel A. Reed, from the *Proceedings of the Fifth Workshop on Input/Output in Parallel and Distributed Systems* pages 57-67), a method is known for predicting future memory access time sequences based on past memory access time sequences. A first disadvantage of this first prior art is that it is too complex to adapt easily to a computer application running on a large number of compute nodes. A second disadvantage of this first prior art is that it is too complex to adapt easily to a computer application using memory access time sequences that are complex.

According to a second prior art, for example presented in the document *I/O Acceleration with Pattern Detection* (Jun He, John Bent, Aaron Torres, Gary Grider, Garth Gibson, Carlos Maltzahn, Xian-He Sun, from the *Proceedings of the 22nd International Symposium on High-Performance Parallel and Distributed Computing* pages 25-36), a method is known for predicting future memory access time sequences based on past memory access time sequences. A first disadvantage of this second prior art is that it is too rigid to adapt to a computer application running on a large number of compute nodes and capable of using multiple types of memory access time sequences. A second disadvantage of this second prior art is that it is too limited to adapt to a computer application using memory access time sequences that are complex.

According to a third prior art, for example presented in documents U.S. Pat. Nos. 7,676,630 and 6,789,171, a method is known for predicting future memory access time sequences on the basis of past memory access time sequences. A first disadvantage of this third prior art is that it is too rigid and too limited to adapt easily to a computer application using memory access time sequences that are complex. A second disadvantage of this third prior art is that it becomes too unreliable in the case of a computer application using memory access time sequences that are complex.

OBJECTS AND SUMMARY OF THE INVENTION

The invention proposes a method for improving the execution time of a computer application by predicting future memory access time sequences on the basis of past memory access time sequences, but which presents a better compromise between efficiency of the result and simplicity of the implementation, particularly in the case of a computer application using memory access time sequences that are complex. The invention preferably provides a method for improving the execution time of a computer application running on a large number of compute nodes and capable of using multiple types of memory access time sequences.

For this, the invention proposes the use of a learning model, which is configured beforehand using a learning database comprising several predetermined types of memory access time sequences, for carrying out the step of determining the type of memory access time sequence, preferably for carrying out this one determination step and preferably for determining only this type of memory access time sequence. This helps to simplify the implementation while ensuring the effectiveness of the result, this limited use of the learning model proving to be sufficient.

The invention proposes a method for improving the execution time of a computer application, comprising at least one cycle comprising:
- a step of determining the type of memory access time sequence occurring during the execution of said computer application,
- a step of preloading data, from a file system to a cache memory system, according to the determined type of memory access time sequence, characterized in that:
said determination step is carried out by a learning model having been previously configured using a database of certain predetermined types of memory access time sequences.

Thus, the execution time of the computer application is greatly improved because the data to be used in the near future have already been loaded into the cache memory, in particular because the correct data were loaded into the cache memory, meaning the data which the currently running computer application will actually need immediately after they are preloaded.

According to another aspect, the cycle is repeated continuously and in real time.

In this manner, the reduction in the execution time of the computer application is obtained throughout the entire execution of the computer application.

In another aspect, the preloading step respectively associates predetermined types of memory access time sequences with predetermined data preloading types.

Indeed, the preloading strategies to be implemented are not identical for all types of memory access time sequences. Associating a predetermined data preloading type with a type of memory access time sequence makes it possible to further reduce the execution time of the computer application. Indeed, the preloading of data is more efficient because then it allows the execution of the application to proceed more quickly when it occurs on the basis of the type of data to be loaded.

According to another aspect, the determination step comprises four types of memory access time sequence, which are:
- the sequential access type, where data blocks are consecutively read and/or written in a memory area,
- the multi-sequential access type with a regular offset between the sequences, where data blocks are read and/or written from several different locations in a memory area, switching regularly from one location to another,
- the random access type,
- the complex access type, where the sequence is formed of regular or quasi-regular subsequences which are repeated but in a disordered manner and/or where the sequence is regular or quasi-regular and is formed of subsequences which are repeated but in a disordered manner In this manner, the numerous memory access time sequences are grouped into a limited number of categories respectively associated with appropriate and homogeneous preloading types, further improving the reduction in the execution time of the computer application, as the data to be preloaded for immediate use by the computer application that is running is even better anticipated.

In another aspect, no data are preloaded in the preloading step associated with the random access type.

In this manner, the learning model does not associate a predetermined preloading type with the random access type. This makes it possible to avoid distorting future data preloads by associating an incorrect preloading type with a memory access time sequence type. This also avoids preloading completely unsuitable data which then need to be unloaded before the correct data can be reloaded, thus causing unnecessary work and delay in processing the necessary tasks.

In another aspect, a memory access time sequence comprises a plurality of memory access operations which follow one another in time:
  preferably at least 30 operations, still more preferably at least 40 operations,
  and/or preferably at most 100 operations, still more preferably at most 60 operations.

In this manner, the grouping of multiple operations makes it possible to obtain a reliable statistical result for the memory access time sequence type. Also, the number of operations necessary to obtain a reliable result is rather low, being between 30 and 100 operations at most, the reliability level of the method already being very good. The compromise between simplicity of the implementation and efficiency of the prediction is thus further improved and well-optimized.

In another aspect, a memory access time sequence is in the form of a temporally sliding window and comprising a fixed number of operations.

The sliding window may be chosen to slide from memory access operation to successive memory access operation. In this case, the number of calculations is increased, as well as the robustness of the method.

As a variant, the grouping can be done in successive blocks of memory access operations, for example every 40 operations. In this case, the method is less responsive but consumes less computing time.

In another aspect, the cycle comprises, after said data preloading step, a step of using said preloaded data in the cache memory system.

In another aspect, the learning model has previously been configured only once, using a database of certain predetermined types of memory access time sequences, but it can be reconfigured in the event that at least one new predetermined type of memory access time sequence is added to said database.

In this manner, new types of memory access time sequences can be integrated into the database. This further improves the execution time of the computer application, since the database includes a wider range of different types of memory access time sequences. Also, even if a type of memory access time sequence is not included in the database at the beginning, updating the database while reconfiguring the learning model makes it possible to recognize this type of memory access time sequence for the future determination of this type of memory access time sequence.

According to another aspect, the type of memory access time sequence is defined by the variation over time of two characteristics, which are the size of the data blocks that are read and/or written and the position of the data blocks in the memory area where they are read and/or written.

In this manner, the memory access time sequence is defined in a simple and efficient manner, because two simple characteristics are sufficient for defining this memory access time sequence in a properly representative manner.

In another aspect, the learning model is based on the use of a "k-means" type of algorithm.

The k-means algorithm is an algorithm which is relatively fast and easy to implement and which is particularly well-suited for determining a type of element that belongs to one of a limited number of predetermined classes. It makes it possible to group data into a number of predefined classes, which is ideal for determining types of memory access time sequences. The k-means algorithm can be trained in order to form a reliable learning model.

In another aspect, the number of classes of said algorithm is strictly greater than the number of predetermined data preloading types.

In this manner, a type of memory access time sequence can be associated with at least one class. Each class of the k-means algorithm is associated with a single predetermined data preloading type. Several classes may be associated with the same predetermined data preloading type. Indeed, the grouping of points corresponding to the same type of memory access time sequence, within a single class, may not be spatially possible or may be particularly difficult. The creation of several classes for a same type of memory access time sequence makes it possible to avoid assignment errors, and thus data preloading errors.

In another aspect, the number of classes of said algorithm is between 2 and 10, preferably between 3 and 10.

Not significantly increasing the number of classes of the algorithm makes it possible to reduce the implementation time of the algorithm. This also reduces the execution time of the computer application, since the number of calculations for determining a type of memory access time sequence is related to the number of classes.

According to another aspect, the cycle successively comprises, prior to said determination step:
  a step of extracting data properties representative of the type of memory access time sequence, followed by a step of grouping these extracted properties into multi-dimensional vectors,
  said extraction step preferably being preceded by a pre-processing step which performs a normalization of said representative data,
  said grouping step preferably being followed by a step of projection by principal component analysis, reducing the number of dimensions of said vectors.

In this manner, the number of calculations is reduced while preserving the relevance of the result. Advantageously, normalization makes it possible to avoid distortions from processing data according to amplitude alone, which is not representative of the type of memory access time sequence. Advantageously, the projection reduces the volume of calculations while preserving all the useful information.

In another aspect, the computer application runs in at least several hundred processes of a set of compute nodes of a same network, preferably at least several thousand of these processes, more preferably at least several tens of thousands of these processes, and the application has access to several hundred files from a same process.

The method is therefore of particular interest for implementation in complex systems, because the memory access time sequences tend to be more repetitive than in simpler systems and the execution time gained by each intelligently performed preload is multiplied by the large number of operations carried out.

MORE DETAILED DESCRIPTION

Figure 1A:
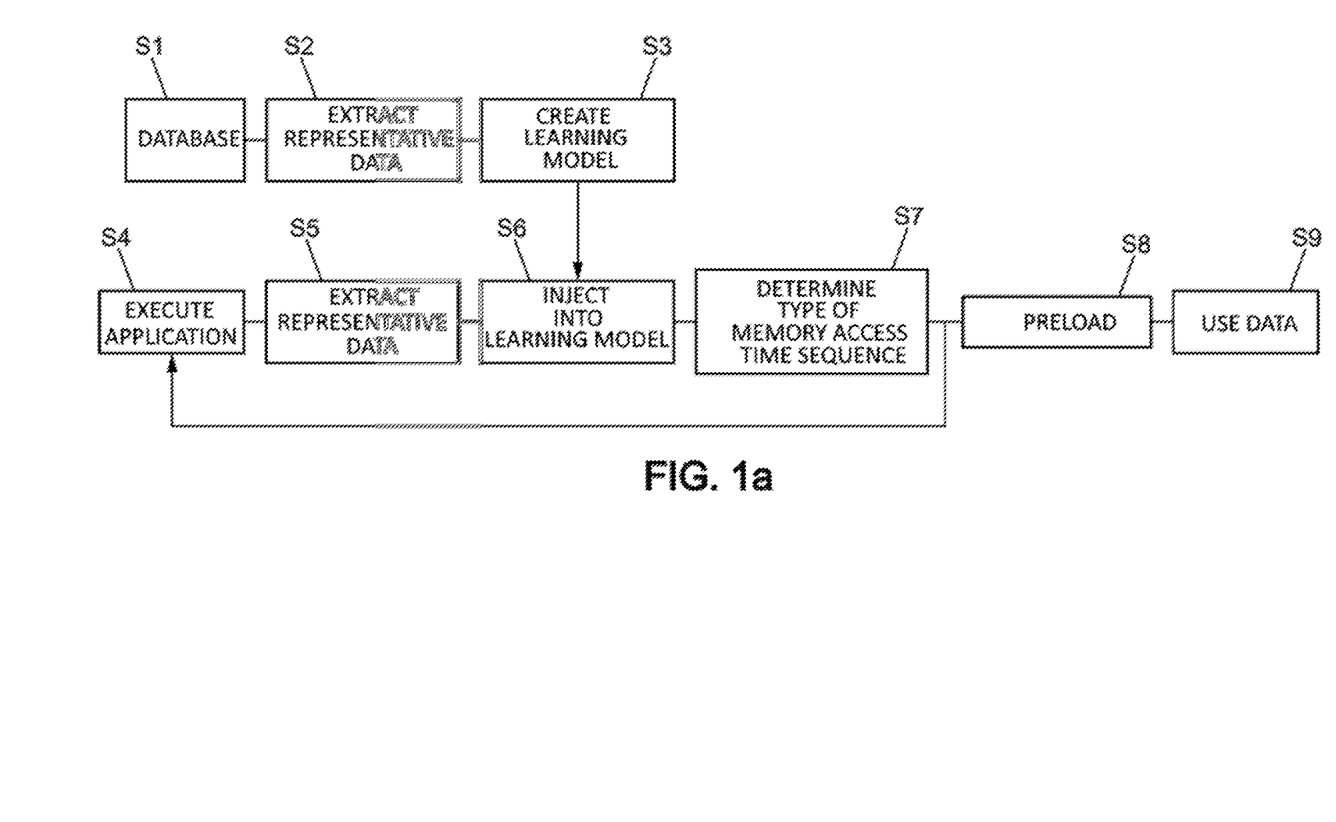
FIG. 1a is a flowchart showing the main steps of the method according to an exemplary embodiment of the invention.

FIG. 1a schematically represents, in flowchart form, the general principle of an exemplary method according to one embodiment of the invention.

The learning step of the method according to the embodiment illustrated in FIG. 1a is illustrated by rectangles S1 to S3. The step of determining the type of memory access time sequence is illustrated by rectangles S4 to S7. The step of preloading data and the step of using the data preloaded in the cache memory system are respectively illustrated by rectangles S8 and S9.

The learning step can be carried out using a database, illustrated in rectangle S1, comprising a database of memory access time sequences. In rectangle S2, data representative of the types of memory access time sequences contained in the database are extracted. The representative data can be grouped into multidimensional vectors. The vectors can then be used for creating the learning model in step S3. The learning model is used to detect the type of memory access time sequence corresponding to memory access time sequences generated during execution of the application.

The learning step can be performed offline, meaning when the computer application is not running. The learning is for example performed only once, prior to the determination step. However, when a type of memory access time sequence that is non-existent in the database is determined, it is possible to rerun the learning in order to include this type of memory access time sequence in the database. The type of memory access time sequence can thus be recognized for a future memory access time sequence.

Also, because the learning model is constructed from a large number of memory access time sequences, it is possible to liken a type of memory access time sequence that is not directly known, to a type of memory access time sequence already known in the database, particularly when the two types of memory access time sequence are similar. For example, the learning model is capable of determining that a memory access time sequence is a multi-sequential access, even if the offset between the memory access operations is not directly known from the learning model.

The determination step is represented by rectangles S4 to S7. The determination step S4 to S7 is performed online, meaning during execution of the computer application. The computer application runs in at least several hundred processes of a set of compute nodes of the same network, preferably at least several thousand of these processes, more preferably at least several tens of thousands of these process. A node is a computing unit. A process is a program running on a computer. It can be defined as a set of instructions to be executed, which may be in ROM or may be loaded from mass storage into RAM. The application has access to several hundred files from a same process.

The determination step comprises, for example, four types of memory access time sequences. The type of memory access time sequence is defined in particular by the variation over time of two characteristics, which are the size of the data blocks read and/or written as well as the position of the data blocks in the memory area where they are read and/or written.

The first type is a sequential access, where data blocks are consecutively read and/or written in a memory area. The second type is a multi-sequential access with a regular offset between the memory access time sequences, where data blocks are read and/or written from several different locations in a memory area, switching regularly one location to another. The third type is a random access, where the position of the data blocks in the memory area where they are read and/or written and the size of the data blocks vary randomly. The fourth type is a complex access, where the memory access time sequence is formed of regular or quasi-regular subsequences which are repeated in a disordered manner Complex access also includes an access where the memory access time sequence is regular or quasi-regular and is formed of sub-sequences repeating in a disordered manner.

Each memory access time sequence may comprise several memory access operations that follow one another in time. In one exemplary embodiment, each memory access time sequence comprises at least thirty operations, and preferably at least forty operations. Each memory access time sequence may comprise at most one hundred operations, and preferably at most sixty operations. In this manner, the grouping of multiple memory access operations in the same memory access time sequence makes it possible to obtain a reliable statistical result. In particular, for a memory access time sequence comprising at least thirty or even preferably forty memory access operations, the type of memory access time sequence is determined with an accuracy of 99%.

Execution of the computer application is represented by rectangle S4. Based on the execution of the computer application, memory access time sequences are generated.

Step S5 comprises the extraction of data representative of the memory access time sequences generated during execution of the application. The representative data are, for example, identical to the properties and data extracted during step S2 of the training. Representative data can be grouped into multidimensional vectors. In step S6, the multidimensional vectors can be injected into the learning model constructed in step S3. Then, the type of memory access time sequence generated by the application currently executing is determined in step S7. The cycle can be repeated from step S7 to step S4.

Based on the determination step, a data preloading step, in particular from a file system to a cache memory system, is performed in step S8. The data preloading step advantageously depends on the type of memory access time sequence determined in step S7. More specifically, the preloading step respectively associates predetermined data preloading types with the predetermined types of memory access time sequences. The cycle can be repeated from step S7 to step S4. The preloaded data are used in step S9.

Figure 1B:
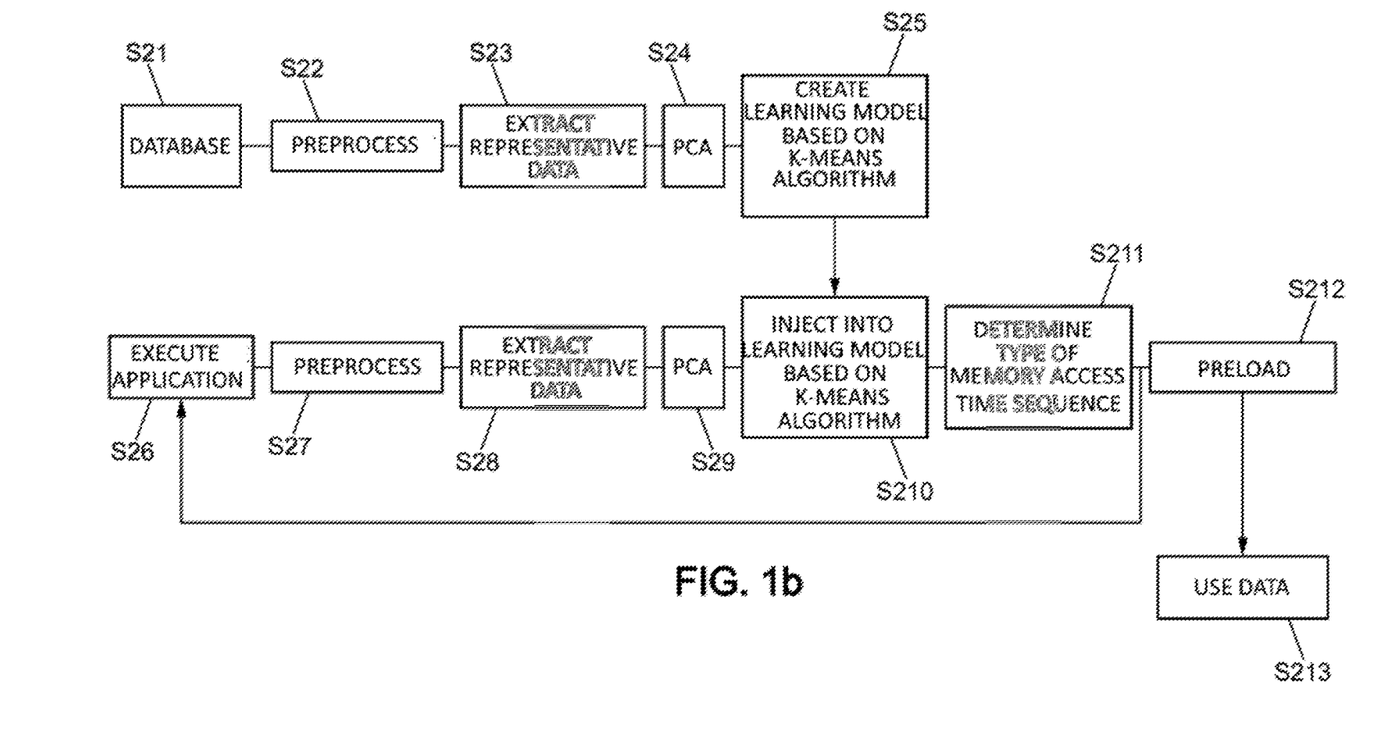
FIG. 1b is a flowchart showing the main steps of the method according to another exemplary embodiment of the invention.

FIG. 1b schematically represents, in flowchart form, an alternative implementation of the method described with reference to FIG. 1a.

The learning step is illustrated by rectangles S21 to S25. The cycle is illustrated by rectangles S26 to S213. More specifically, the step of determining the type of memory access time sequence is illustrated by rectangles S26 to S211. The preloading data step is illustrated by rectangle S212. The step of using the preloaded data in the cache memory system is illustrated by step S213.

The learning step can be performed using a database, illustrated in rectangle S21. The database includes a database of memory access time sequences. The database of memory access time sequences is for example the one described with reference to FIG. 1a. The memory access time sequences included in the database are, in this example, preprocessed in step S22. The preprocessing comprises, for example, normalization of a characteristic defining the memory access time sequences. For example, the positions of the data blocks in the memory area where they are read/written are normalized. The preprocessing method used is for example a "minmax" normalization method, which can be written in the form:

$$z_i = \frac{x_i - \min(x)}{\max(x) - \min(x)},$$

where $z_i$ is the normalized characteristic, and x the characteristic to be normalized. Here, x is the position of the data blocks in the memory area where they are read and/or written.

In rectangle S23, data representative of the normalized memory access time sequences are extracted and grouped into multidimensional vectors. Step S23 is comparable to step S2 described with reference to FIG. 1a. The representative data are, for example, the same data as those extracted during the learning step.

The multidimensional vectors may be subjected to a projection according to principal component analysis (or "PCA" in the following description) in step S24. PCA allows reducing the number of dimensions of the multidimensional vectors. Specifically, the goal of PCA is to project the multidimensional vectors into specific spaces in order to detect the main axes of the properties of the representative data. The principal components containing most of the information are identified, making it possible to reduce the dimensionality of the multidimensional vectors. In this exemplary embodiment, the multidimensional vectors are for example projected on two axes.

After the PCA, the reduced multidimensional vectors are used to create a learning model in step S25.

In the particular embodiment described with reference to FIG. 1b, the learning model is based on the use of a k-means algorithm. The k-means algorithm is used to group data into a number of predefined classes. In this example, a class may be associated with at least one type of memory access time sequence. The k-means algorithm includes the random generation of centroids. The generation of centroids is based on projection of the reduced multidimensional vectors in the two-axis system obtained after the PCA. The reduced multidimensional vectors are assigned to the nearest centroids. Then the centroids are recalculated according to the reduced multidimensional vectors that have been assigned to them. The learning model, based on the k-means algorithm, can be used when the centroids converge to a stable pair of coordinates.

Alternatively, the PCA projection can be on more than two axes.

The determination step, represented by rectangles S26 to S211, comprises executing the computer application represented by rectangle S26. Rectangle S26 corresponds to the rectangle S4 described with reference to FIG. 1a.

Based on the execution of the computer application, memory access time sequences are generated. The determination step is for example carried out for one memory access time sequence at a time. In a variant, the determination step is applied to more than one memory access time sequence at a time. In this example, the memory access time sequence is preprocessed in step S27. The preprocessing comprises, for example, normalization of a characteristic defining the memory access time sequence, such as the positions of the data blocks in the memory area where they are read/written. The preprocessing method used is for example a "minmax" normalization method, which can be written in the form:

$$z_i = \frac{x_i - \min(x)}{\max(x) - \min(x)},$$

where $z_i$ is the normalized characteristic, and $x_i$ is the characteristic to be normalized. Here, x corresponds to the position of the data blocks in the memory area where they are read and/or written.

In rectangle S28, the data representative of the normalized memory access time sequence are extracted and grouped into a multidimensional vector. Step S28 can be likened to step S5 described with reference to FIG. 1a.

The multidimensional vector may undergo projection according to principal component analysis (or "PCA" in the description below) in step S29. The PCA performed in step S29 may be identical to the PCA performed in step S24. Thus, the reduced multidimensional vector is for example projected on two axes.

Then, in step S210, the reduced multidimensional vector is injected into the learning model obtained in step S25. Step S210 corresponds to step S6 described with reference to FIG. 1a. Specifically, the reduced multi-dimensional vector is injected into the learning model based on the k-means algorithm. Computation of the distance of the reduced multidimensional vector to each centroid is performed in order to determine, in step S211, the type of the memory access time sequence. For example, the Euclidean distance between the reduced multidimensional vector and the coordinate vector of a centroid is calculated as follows:

$$d(p, q) = \sqrt{\sum_{i=1}^{n} (qi - pi)^2}$$

The reduced multidimensional vector is associated with the centroid with which it has the smallest Euclidean distance. The type of the memory access time sequence is determined based on the centroid with which the reduced multidimensional vector is associated.

The number of classes, each class being associated with a centroid, is greater than or equal to the number of types of memory access time sequences. For example, if the number of types of memory access time sequences is equal to four, the k-means algorithm generates at least four centroids, thus at least four classes. Indeed, two vectors, corresponding to a same type of memory access time sequence, may be projected into the specific space at positions that do not allow them to be associated with the same centroid. Thus, the creation of two centroids (or two classes) for a same type of memory access time sequence avoids the creation of errors in determining the types of memory access time sequences. The number of classes of the k-means algorithm is for example comprised between 2 and 10. Advantageously, the number of classes is between 3 and 10. Still more advantageously, the number of classes is between 4 and 10. The cycle may be repeated from step S211 to step S26.

In step S212, a data preloading step, in particular from a file system to a cache memory system, is performed. Step S212 advantageously corresponds to step S8. The data preloading step depends on the type of memory access time sequence determined in step S211. Alternatively, the cycle may be repeated after the preloading step S212.

Step S213 comprises a use of data preloaded in step S212. The cycle may be repeated from step S26 to step S213.

The method according to the invention therefore requires very few calculations, which makes it a method simple to implement while being very reliable.

FIGS. 2a to 3b illustrate a particular embodiment of the method described with reference to FIG. 1b.

Figure 2A:
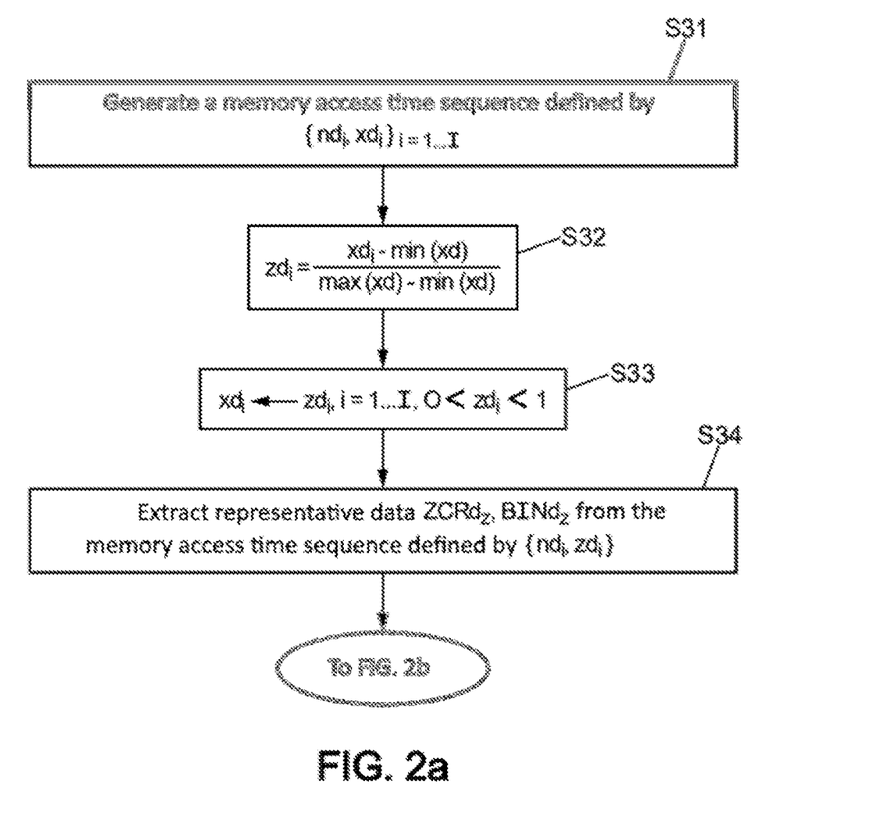
FIGS. 2a and 2b are a flowchart showing the main steps of the cycle of the method according to an exemplary embodiment of the invention.
Figure 2B:
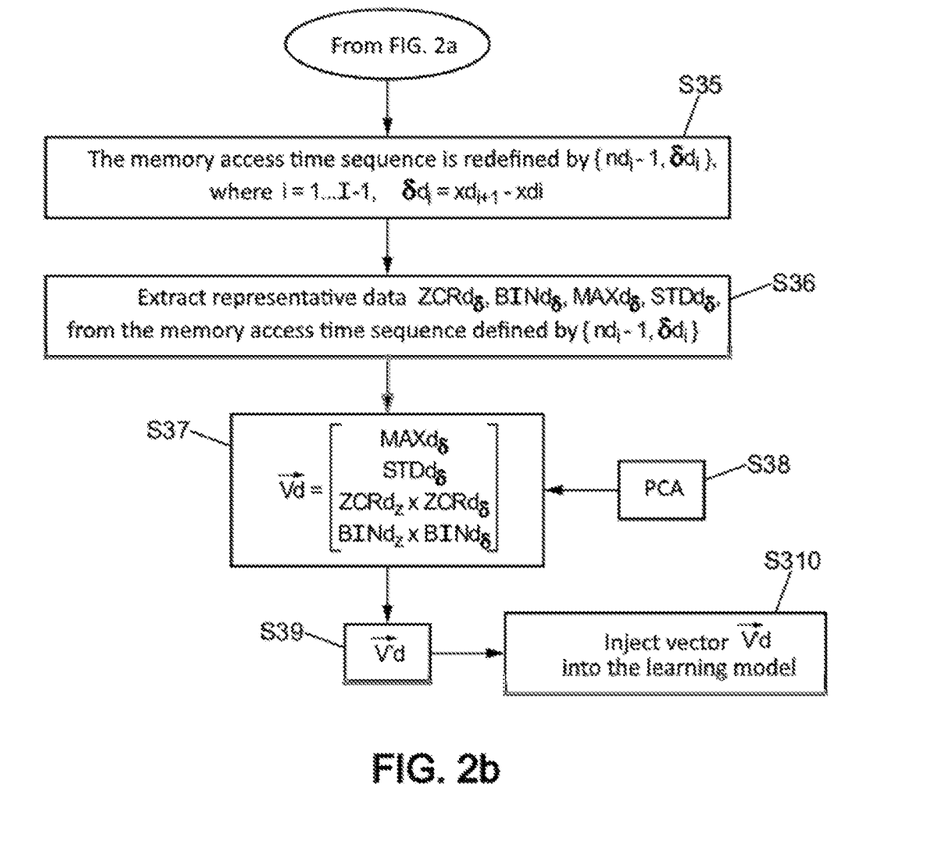

FIGS. 2a and 2b are a flowchart illustrating a particular embodiment of the cycle of the method according to the invention, for a single memory access time sequence.

Step S31 corresponds to the execution of the computer application. The memory access time sequence generated during execution of the computer application can be defined by the size $nd_i$ of the read and/or written data blocks, as well as the positions $xd_i$ of the data blocks in the memory area where they are read and/or written, the index i corresponding to each data block (or each memory access operation). In the remainder of the description, the size $nd_i$ of the read and/or written data blocks is called "size $nd_i$", and the position of the data blocks $xd_i$ in the memory area where they are read and/or written is called "position $xd_i$".

In step S32, the positions $xd_i$ of the data blocks are normalized, using the minmax normalization method described with reference to FIG. 1b. The value of the normalized positions $zd_i$ is between 0 and 1. Normalization of the positions $xd_i$ makes it possible to apply the steps of the method to identical values, so as not to distort the result from determining the type of memory access time sequence.

In step S33, each position $xd_i$ is replaced by the corresponding normalized position $zd_i$. The memory access time sequence is therefore defined by its size $nd_i$, and the normalized positions $zd_i$.

In step S34, and from each calculated normalized position $zd_i$, two data items representative of the memory access time sequence are calculated. The first data item is the mean crossing rate of the memory access time sequence $ZCRd_z$. The second data item is the number of non-empty memory locations $BINd_z$ in the histogram representing the positions $zd_i$ of the memory access time sequence. More specifically, the non-empty memory locations $BINd_z$ of the histogram of the memory access time sequence represent the number of memory accesses at a common memory location. A non-empty location represents a memory location where a memory access operation takes place.

In step S35, the memory access time sequence is transformed. The memory access time sequence is defined by its size $nd_i-1$ and the difference $\delta d_i$ between two successive positions $xd_i$ and $xd_{i+1}$ where $\delta d_i = xd_{i+1} - xd_i$. This makes it possible to integrate a time aspect into the memory access operations of the memory access time sequence.

In step S36, representative data are extracted from the memory access time sequence defined by the characteristics $nd_i-1$ and $\delta d$. More specifically, the mean crossing rate of the memory access time sequence $ZCRd_\delta$ and the number of non-empty memory locations $BINd_\delta$ in the histogram representing the positions $\delta d_i$ of the memory access time sequence are extracted. The maximum value of the memory access time sequence $MAXd_\delta$ is also extracted. Finally, the standard deviation $STDd_\delta$ of the values of the sequence is extracted.

In step S37, the representative data calculated in steps S34 and S36 are grouped into a multidimensional vector Vd of four dimensions:

$$\begin{bmatrix} MAXd_\delta \\ STDd_\delta \\ ZCRd_z \times ZCRd_\delta \\ BINd_z \times BINd_\delta \end{bmatrix}$$

The mean crossing rates of the memory access time sequence $ZCRd_z$ and $ZCRd_\delta$ are assembled to add dependency between the memory access time sequences. The numbers of non-empty memory locations $BINd_z$ and $BINd_\delta$ are also assembled to add dependency between the time sequences defined in steps S33 and S35.

In step S38, the vector Vd is projected using principal component analysis (or "PCA"), in order to obtain a reduced multidimensional vector V'd in step S39. More precisely, the projection using PCA is for example on two axes. The multidimensional vector Vd of four dimensions becomes the vector V'd of two dimensions.

The reduced multidimensional vector V'd may then be applied to the learning model in step S40. The cycle may be repeated for each new memory access time sequence. The steps of the cycle may also be carried out simultaneously for multiple memory access time sequences.

Figure 3A:
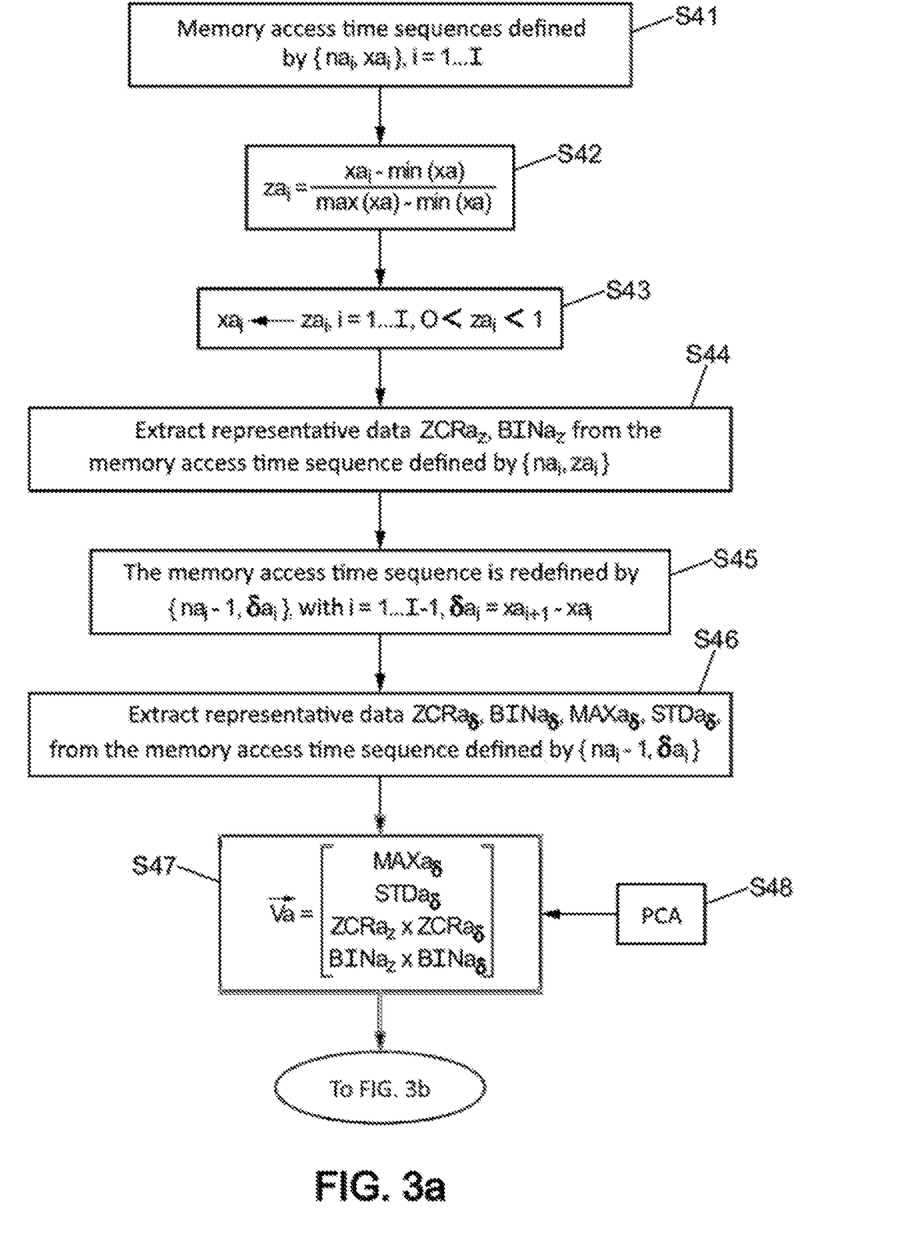
FIGS. 3a and 3b are a flowchart representing the main learning steps of the method, as well as the step of determining the type of memory access time sequence taking place by means of the learning step, according to an exemplary embodiment of the invention.
Figure 3B:
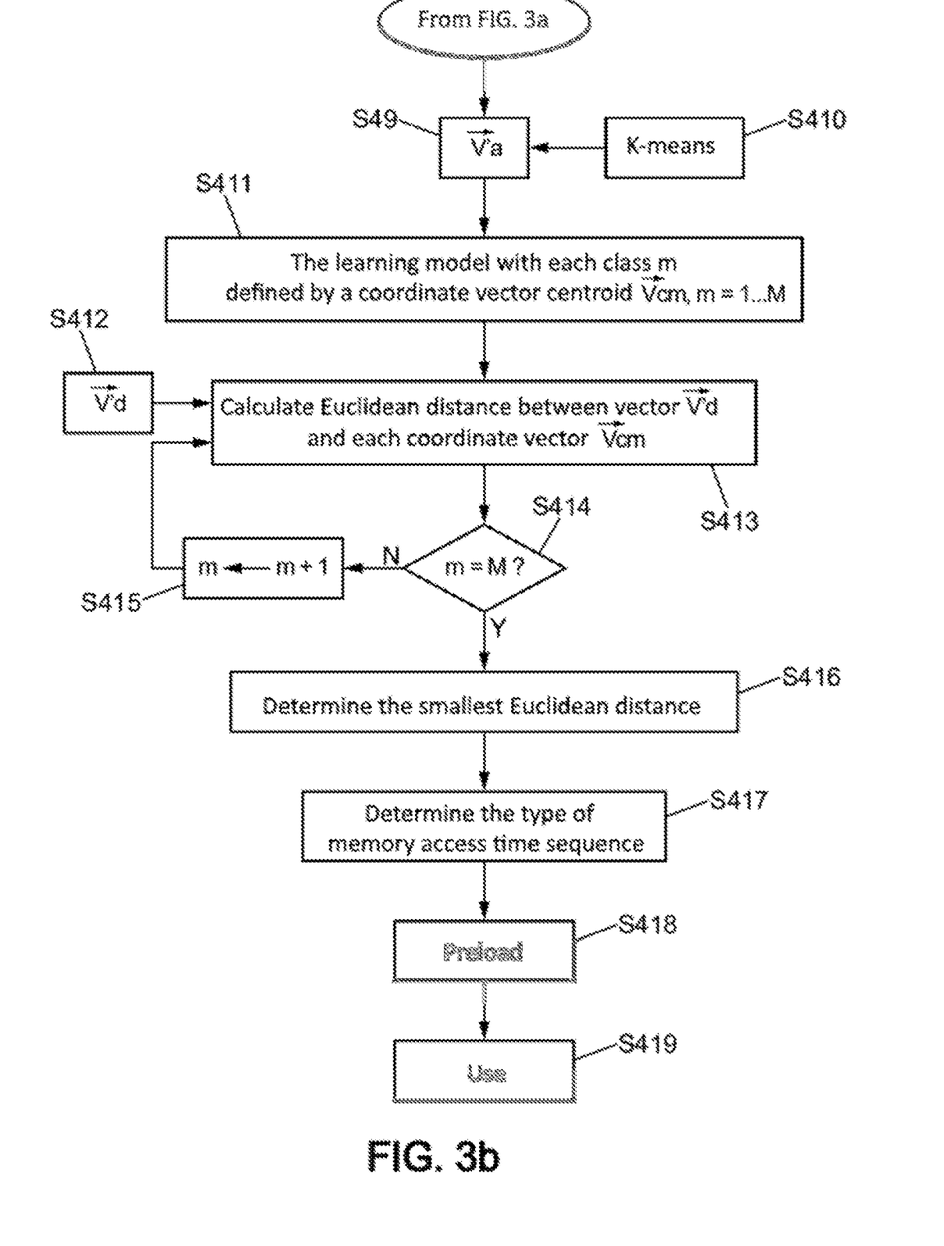

FIGS. 3a and 3b are a flowchart illustrating an exemplary embodiment of the learning model of the method according to the invention, as well as the determination of the type of memory access time sequence based on the learning model.

Steps S41 to S411 form the learning step. The database comprises a plurality of memory access time sequences defined by their size $na_i$ of data blocks read and/or written, as well as the positions of the data blocks $xa_i$ in the memory area where they are read and/or written. The index i corresponds to each data block (or to each memory access operation). In the rest of the description, the size $na_i$ of the read and/or written data blocks is called "size $na_i$", and the position of the data blocks $xa_i$ in the memory area where they are read and/or written is called "position $xa_i$". This corresponds to step S41.

The learning step is described for a single memory access time sequence, although the learning step is performed for the plurality of memory access time sequences included in the database.

In step S42, the positions $xa_i$ of the data blocks of the memory access time sequence are normalized using the "minmax" normalization method described with reference to FIG. 1b. The value of the normalized positions $za_i$ is between 0 and 1.

In step S43, each position $xa_i$ is replaced by the corresponding normalized position $za_i$.

In step S44, and using the normalized memory access time sequence, two data items representative of the memory access time sequence are calculated. The first data item is the mean crossing rate of the memory access time sequence $ZCRa_z$. The second data item is the number of non-empty memory locations $BINa_z$ in the histogram representing the positions $za_i$ of the memory access time sequence. More specifically, the non-empty memory locations of the memory access time sequence represent the number of memory accesses at a common memory location. A non-empty location represents a memory location where a memory access operation takes place.

In step S45, the memory access time sequence is transformed into a memory access time sequence represented by its size $na_i-1$ and the difference $\delta a_i$ between two successive positions $xa_i$ and $xa_{i+1}$, where $\delta a_i = xa_{i+1} - xa_i$. This makes it possible to integrate a time aspect into the memory access operations of the memory access time sequence.

In step S46, representative data are extracted from the memory access time sequence defined by the characteristics $na_i-1$ and $\delta a$. More specifically, the mean crossing rate of the memory access time sequence $ZCRa_\delta$ is extracted and the number of non-empty memory locations $BINa_\delta$ in the histogram is extracted. The maximum value of the memory access time sequence $MAXa_\delta$ is also extracted. Finally, the standard deviation $STDa_\delta$ of the values of the sequence is extracted.

In step S47, the properties of the calculated representative data are grouped into a multidimensional vector Va of four dimensions:

$$\vec{Va}\begin{bmatrix} MAXa_\delta \\ STDa_\delta \\ ZCRa_z \times ZCRa_\delta \\ BINa_z \times BINa_\delta \end{bmatrix}$$

The mean crossing rates of the memory access time sequence $ZCRa_z$ and $ZCRa_\delta$ are assembled to add dependency between the memory access time sequences. The numbers of non-empty memory locations $BINa_z$ and $BINa_\delta$ are also assembled to add dependency between the time sequences defined in steps S43 and S45.

In step S48, the vector Va is projected using principal component analysis (or "PCA"), in order to obtain a reduced multidimensional vector V'a in step S49. More precisely, the projection using PCA is for example on two axes. The multidimensional vector Va of four dimensions becomes the vector V'a of two dimensions.

In step S410, the k-means algorithm is applied to the reduced multidimensional vector V'a. The k-means algorithm, using the vector V'a, randomly generates centroids corresponding to a class. In the example described above, a single multidimensional vector V'a is obtained. When the learning step is performed on a plurality of memory access time sequences, the number of reduced multidimensional vectors V'a is large. This allows creating as many classes as are desired. The number of classes is predetermined based on the number of types of memory access time sequences to be determined. A class can correspond to a type of memory access time sequence. When the centroids converge to a stable coordinate vector, the learning model is built.

In step S411, the classes defined by their vector centroids $Vc_m$ are defined. The index m represents each class, with m comprised between 1 and M, M being the total number of classes. Each class corresponds to a type of memory access time sequence. A type of memory access time sequence can correspond to multiple classes.

In step S412, the reduced multidimensional vector V'd, obtained in step S39 described with reference to FIG. 2b, is applied to the learning model. The model is used to classify each memory access time sequence corresponding to a reduced multidimensional vector V'd. The reduced multidimensional vector V'd is projected into the specific space defined by PCA and the K-means algorithm. The Euclidean distance between each vector $Vc_m$ corresponding to a centroid and the reduced multidimensional vector V'd is calculated in step S413.

Steps S414 and S415 make it possible to verify that the Euclidean distance between the reduced multidimensional vector V'd and all the centroids has indeed been performed. The smallest Euclidean distance dm is retained in step S416. The type of memory access time sequence is the one associated with the class whose centroid has the smallest Euclidean distance to the reduced multidimensional vector V'd. Determination of the type of sequence is carried out in step S417.

The determination of the type of memory access time sequence makes it possible to trigger a data preloading mechanism associated with the type of memory access time sequence determined in step S418. A step of using the preloaded data S419 is further provided.

The invention claimed is:

1. A method for improving the execution time of a computer application, comprising at least one cycle comprising:
   a step of determining a type of memory access time sequence occurring during execution of said computer application; and
   a step of preloading data, from a file system to a cache memory system, according to the determined type of memory access time sequence,
   wherein said step of determining is carried out by a learning model having been previously configured using a database containing certain predetermined types of memory access time sequences, and extracting from said database data representative of the types of memory access time sequences contained in the database, the data representative of the types of memory access time sequences being grouped into multidimensional vectors injected in the learning model during configuration of said learning model.

2. The method according to claim 1, wherein:
   said cycle is repeated continuously and in real time.

3. The method according to claim 1, wherein:
   said step of preloading data respectively associates predetermined types of memory access time sequences with predetermined data preloading types.

4. The method according to claim 1, wherein the memory access time sequence comprises at least 30 memory access operations which follow one another in time.

5. The method according to claim 4, wherein:
   the memory access time sequence is in the form of a temporally sliding window and comprises a fixed number of operations.

6. The method according to claim 1, wherein:
   the cycle comprises, after said step of preloading data, a step of using said preloaded data in the cache memory system.

7. The method according to claim 1, wherein:
   said learning model has previously been configured only once, using a database of certain predetermined types of memory access time sequences, said learning model being reconfigurable in the event that at least one new predetermined type of memory access time sequence is added to said database.

8. The method according to claim 1, wherein:
the type of memory access time sequence is defined by a variation over time of two characteristics: the size of data blocks that are read and/or written, and a position of the data blocks in a memory area where the data blocks are read and/or written.

9. The method according to claim 1, wherein:
said learning model is based on the use of a "k-means" type of algorithm.

10. The method according to claim 9, wherein:
a number of classes of said algorithm is strictly greater than a number of predetermined data preloading types.

11. The method according to claim 9, wherein:
a number of classes of said algorithm is between 2 and 10.

12. The method according to claim 1, wherein the cycle successively comprises, prior to said step of determining:
a step of extracting data properties representative of the type of memory access time sequence, followed by a step of grouping the extracted properties into multidimensional vectors,
said step of extracting data properties being preceded by a preprocessing step which performs a normalization of said representative data,
said step of grouping being followed by a step of projection by principal component analysis, reducing a number of dimensions of said vectors.

13. The method according to claim 1, wherein:
said computer application runs in at least hundreds of processes of a set of compute nodes of a same network, and
said application has access to hundreds of files from a same process.

14. A method for improving the execution time of a computer application, comprising at least one cycle comprising:
a step of determining a type of memory access time sequence occurring during execution of said computer application,
a step of preloading data, from a file system to a cache memory system, according to the determined type of memory access time sequence,
said determination step carried out by a learning model having been previously configured using a database of predetermined types of memory access time sequences,
wherein the predetermined types of memory access time sequences of said determination step comprises four different types of memory access time sequence:
a sequential access type, where data blocks are consecutively read and/or written in a memory area,
a multi-sequential access type with a regular offset between the sequences, where data blocks are read and/or written from plural different locations in a memory area, switching regularly from one location to another,
a random access type, and
a complex access type, where the sequence is formed of regular or quasi-regular subsequences which are repeated but in a disordered manner and/or where the sequence is regular or quasi-regular and is formed of subsequences which are repeated but in a disordered manner,
and wherein the preloading step is performed for each of the types of memory access time sequence, except for the random access type for which no data are preloaded in the preloading step.

15. The method for improving the execution time of a computer application according to claim 1, wherein:
the determination step comprises four types of memory access time sequence, which are:
the sequential access type, where data blocks are consecutively read and/or written in a memory area,
the multi-sequential access type with a regular offset between the sequences, where data blocks are read and/or written from several different locations in a memory area, switching regularly from one location to another,
the random access type,
the complex access type, where the sequence is formed of regular or quasi-regular subsequences which are repeated but in a disordered manner and/or where the sequence is regular or quasi-regular and is formed of subsequences which are repeated but in a disordered manner.

* * * * *